US011235752B2

(12) United States Patent
Morisaki

(10) Patent No.: US 11,235,752 B2
(45) Date of Patent: Feb. 1, 2022

(54) VEHICLE CONTROL DEVICE

(71) Applicant: TOYOTA JIDOSHA KABUSHIKI KAISHA, Toyota (JP)

(72) Inventor: Keisuke Morisaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 264 days.

(21) Appl. No.: 16/364,406

(22) Filed: Mar. 26, 2019

(65) Prior Publication Data
US 2019/0315340 A1 Oct. 17, 2019

(30) Foreign Application Priority Data
Apr. 16, 2018 (JP) .............................. JP2018-078460

(51) Int. Cl.
*B60W 20/40* (2016.01)
*B60W 30/16* (2020.01)
*G05D 1/00* (2006.01)
*B60W 30/182* (2020.01)
*B60W 20/10* (2016.01)
(Continued)

(52) U.S. Cl.
CPC .......... *B60W 20/40* (2013.01); *B60W 30/162* (2013.01); *B60W 30/182* (2013.01); *G05D 1/0088* (2013.01); *B60W 20/00* (2013.01); *B60W 20/10* (2013.01); *B60W 30/188* (2013.01); *G05D 3/00* (2013.01); *G05D 13/00* (2013.01); *G05D 17/00* (2013.01); *G05D 2201/0213* (2013.01)

(58) Field of Classification Search
CPC ...... B60W 20/40; B60W 20/00; B60W 20/10; B60W 30/162; B60W 30/182; B60W 30/188; G05D 1/0088; G05D 3/00; G05D 13/00; G05D 17/00
See application file for complete search history.

(56) References Cited

U.S. PATENT DOCUMENTS

| 8,700,243 | B2 * | 4/2014 | Kamijo | F02N 11/0844 |
| | | | | 701/22 |
| 2004/0172186 | A1 * | 9/2004 | Grill | G08G 1/163 |
| | | | | 701/96 |

(Continued)

FOREIGN PATENT DOCUMENTS

| CN | 201116074 Y | * | 9/2008 |
| CN | 105438167 A | * | 3/2016 |

(Continued)

*Primary Examiner* — Hunter B Lonsberry
*Assistant Examiner* — Jay Khandpur
(74) *Attorney, Agent, or Firm* — Sughrue Mion, PLLC

(57) ABSTRACT

A vehicle control device aims to ensure more appropriate self-driving based on circumstances around its own vehicle. The vehicle control device controls an engine and a motor such as to drive the vehicle with changing over between motor drive without operation of the engine and hybrid drive with operation of the engine. In the motor drive in a self-driving mode where the vehicle is driven independently of a driver's accelerating or decelerating operation, the vehicle control device maintains the motor drive when an other vehicle condition is not met, where the other vehicle condition is a condition that any other vehicle is present in a predetermined distance at least either ahead of the own vehicle or behind the own vehicle, while allowing for a shift to the hybrid drive when the other vehicle condition is met.

11 Claims, 6 Drawing Sheets

(51) Int. Cl.
    *G05D 3/00*     (2006.01)
    *B60W 30/188*     (2012.01)
    *B60W 20/00*     (2016.01)
    *G05D 13/00*     (2006.01)
    *G05D 17/00*     (2006.01)

(56) References Cited

U.S. PATENT DOCUMENTS

| | | |
|---|---|---|
| 2015/0175157 A1 | 6/2015 | Teraya et al. |
| 2015/0314771 A1 | 11/2015 | Dextreit et al. |
| 2017/0008513 A1 | 1/2017 | Itagaki |

FOREIGN PATENT DOCUMENTS

| | | | |
|---|---|---|---|
| JP | 2017-190041 A | 10/2007 | |
| JP | 2015-116967 A | 6/2015 | |
| JP | 2015-182629 A | 10/2015 | |
| JP | 2017-019390 A | 1/2017 | |
| JP | 2017-165131 A | 9/2017 | |
| JP | 2017190041 A * | 10/2017 | |
| WO | WO-2008050530 A1 * | 5/2008 | ............. B60K 6/445 |

\* cited by examiner

VEHICLE CONTROL DEVICE

CROSS-REFERENCE TO RELATED APPLICATION

This application claims priority to Japanese Patent Application No. 2018-078460 filed on Apr. 16, 2018, the contents of which is incorporated herein by reference.

TECHNICAL FIELD

The present disclosure relates to a vehicle control device and more specifically a vehicle control device mounted on a hybrid vehicle that is equipped with an engine, a motor and a power storage device.

BACKGROUND

A vehicle control device is mounted on a hybrid vehicle equipped with an engine, a motor and a battery that transmits electric power to and from the motor and is configured to change over the drive of the hybrid vehicle from an EV mode in which the hybrid vehicle is driven with the power of the motor to an HV mode in which the hybrid vehicle is driven with the power of the engine and the power of the motor, when a required driving force exceeds a start reference value. A proposed configuration of such a vehicle control device generates a profile that indicates a variation in the required driving force during self-driving and controls the engine and the motor according to the generated profile (as described in, for example, JP 2017-190041A). This vehicle control device regenerates the profile, when the generated profile includes any point where the required driving force exceeds the start reference value and the required driving force is changeable in such a range that the acceleration does not become lower than a lower limit acceleration. This reduces the frequency when the required driving force exceeds the start reference value, i.e., the frequency of starting the engine.

CITATION LIST

Patent Literature

PTL 1: JP2017-190041A

SUMMARY

The vehicle control device described above, however, does not take into account whether any other vehicle is present ahead of the own vehicle or behind the own vehicle during the self-driving. The self-driving is thus likely to be not sufficiently suitable for the circumstances around the own vehicle. There is accordingly still room for improvement.

A vehicle control device of the present disclosure mainly aims to ensure more appropriate self-driving based on circumstances around its own vehicle.

In order to achieve the above primary object, the vehicle control device of the disclosure is implemented by an aspect described below.

The present disclosure is directed to a vehicle control device. The vehicle control device according to the first aspect of the present disclosure includes an engine, a motor and a power storage device that transmits power to and from the motor and configured to control the engine and the motor such as to drive the hybrid vehicle while changing over between motor drive without operation of the engine and hybrid drive with operation of the engine. In the motor drive in a self-driving mode where the hybrid vehicle is driven independently of a driver's accelerating or decelerating operation, the vehicle control device maintains the motor drive when an other vehicle condition is not met, where the other vehicle condition is a condition that any other vehicle is present in a predetermined distance at least either ahead of its own vehicle or behind the own vehicle, while allowing for a shift to the hybrid drive when the other vehicle condition is met.

The vehicle control device according to the first aspect of the present disclosure controls the engine and the motor such as to drive the hybrid vehicle while changing over between the motor drive without operation of the engine and the hybrid drive with operation of the engine. In the motor drive in the self-driving mode where the hybrid vehicle is driven independently of the driver's accelerating or decelerating operation, the vehicle control device of this aspect maintains the motor drive when the other vehicle condition that any other vehicle is present in the predetermined distance at least either ahead of the own vehicle or behind the own vehicle, is not met, while allowing for a shift to the hybrid drive when the other vehicle condition is met. The "predetermined distance" means a boundary distance for determining whether there is a need to take into account driving of any other vehicle (for example, inter-vehicle distance) in the self-driving mode. In the motor drive in the self-driving mode, the configuration of maintaining the motor drive when the other vehicle condition is not met improves the fuel consumption. The configuration of allowing for a shift to the hybrid drive when the other vehicle condition is met enables the hybrid vehicle to be driven in accordance with driving of other vehicles (for example, with keeping appropriate inter-vehicle distances). As a result, this configuration ensures the more appropriate self-driving based on the circumstances around the own vehicle.

The vehicle control device according to the second aspect of the present disclosure includes an engine, a motor and a power storage device that transmits power to and from the motor and configured to control the engine and the motor such as to drive the hybrid vehicle while changing over between motor drive without operation of the engine and hybrid drive with operation of the engine and to start the engine and shift the drive of the hybrid vehicle to the hybrid drive when a parameter involved in driving output becomes equal to or larger than a start reference value of the engine during the motor drive. In the motor drive in a self-driving mode where the hybrid vehicle is driven independently of a driver's accelerating or decelerating operation, the vehicle control device restricts the parameter to a range smaller than the start reference value when an other vehicle condition is not met, where the other vehicle condition is a condition that any other vehicle is present in a predetermined distance at least either ahead of its own vehicle or behind the own vehicle, while not restricting the parameter to a range smaller than the start reference value when the other vehicle condition is met.

The vehicle control device according to the second aspect of the present disclosure controls the engine and the motor such as to drive the hybrid vehicle while changing over between the motor drive without operation of the engine and the hybrid drive with operation of the engine, and additionally starts the engine and shifts the drive of the hybrid vehicle to the hybrid drive when the parameter involved in driving output becomes equal to or larger than the start reference value of the engine during the motor drive. In the motor drive in the self-driving mode where the hybrid vehicle is driven independently of the driver's accelerating or decelerating operation, the vehicle control device of this aspect restricts the parameter to a range smaller than the start reference value when the other vehicle condition that any other vehicle is present in the predetermined distance at least either ahead of the own vehicle or behind the own vehicle, is not met, while not restricting the parameter to a range smaller than the start reference value when the other vehicle condition is met. The "predetermined distance" means a boundary distance for determining whether there is a need to take into account driving of any other vehicle (for example, inter-vehicle distance) in the self-driving mode. The "parameter involved in driving output" is, for example, a required output for driving (required torque or required power), a vehicle speed or an acceleration. In the motor drive in the self-driving mode, the configuration of restricting the parameter to a range smaller than the start reference value, i.e., maintaining the motor drive when the other vehicle condition is not met improves the fuel consumption. The configuration of not restricting the parameter to a range smaller than the start reference value, i.e., allowing for a shift to the hybrid drive when the other vehicle condition is met enables the hybrid vehicle to be driven in accordance with driving of other vehicles (for example, with keeping appropriate inter-vehicle distances). As a result, this configuration ensures the more appropriate self-driving based on the circumstances around the own vehicle.

The vehicle control device according to the third aspect of the present disclosure includes an engine, a motor and a power storage device that transmits power to and from the motor and configured to control the engine and the motor such as to drive the hybrid vehicle while changing over between motor drive without operation of the engine and hybrid drive with operation of the engine. In a process of starting the engine in a self-driving mode where driving output is controlled independently of a driver's accelerating or decelerating operation, the vehicle control device performs first start control to start the engine with giving preference to a response over reduction of starting shock when an other vehicle condition is met, where the other vehicle condition is a condition that any other vehicle is present in a predetermined distance at least either ahead of its own vehicle or behind the own vehicle, and the vehicle control device performs second start control to start the engine with giving preference to the reduction of starting shock over the response when the other vehicle condition is not met.

The vehicle control device according to the third aspect of the present disclosure controls the engine and the motor such as to drive the hybrid vehicle while changing over between the motor drive without operation of the engine and the hybrid drive with operation of the engine. In the process of starting the engine in the self-driving mode where the driving output is controlled independently of the driver's accelerating or decelerating operation, the vehicle control device of this aspect performs the first start control to start the engine with giving preference to the response over the reduction of starting shock when the other vehicle condition that any other vehicle is present in the predetermined distance at least either ahead of the own vehicle or behind the own vehicle, is met. The vehicle control device of this aspect performs the second start control to start the engine with giving preference to the reduction of starting shock over the response when the other vehicle condition is not met. The "predetermined distance" means a boundary distance for determining whether there is a need to take into account driving of any other vehicle (for example, inter-vehicle distance) in the self-driving mode. The configuration of performing the first start control when the other vehicle condition is met and of performing the second start control when the other vehicle condition is not met in the process of starting the engine in the self-driving mode ensures the more appropriate self-driving based on the circumstances around the own vehicle.

DESCRIPTION OF EMBODIMENTS

Some aspects of the present disclosure are described below with reference to embodiments.

Embodiment 1

Figure 1:
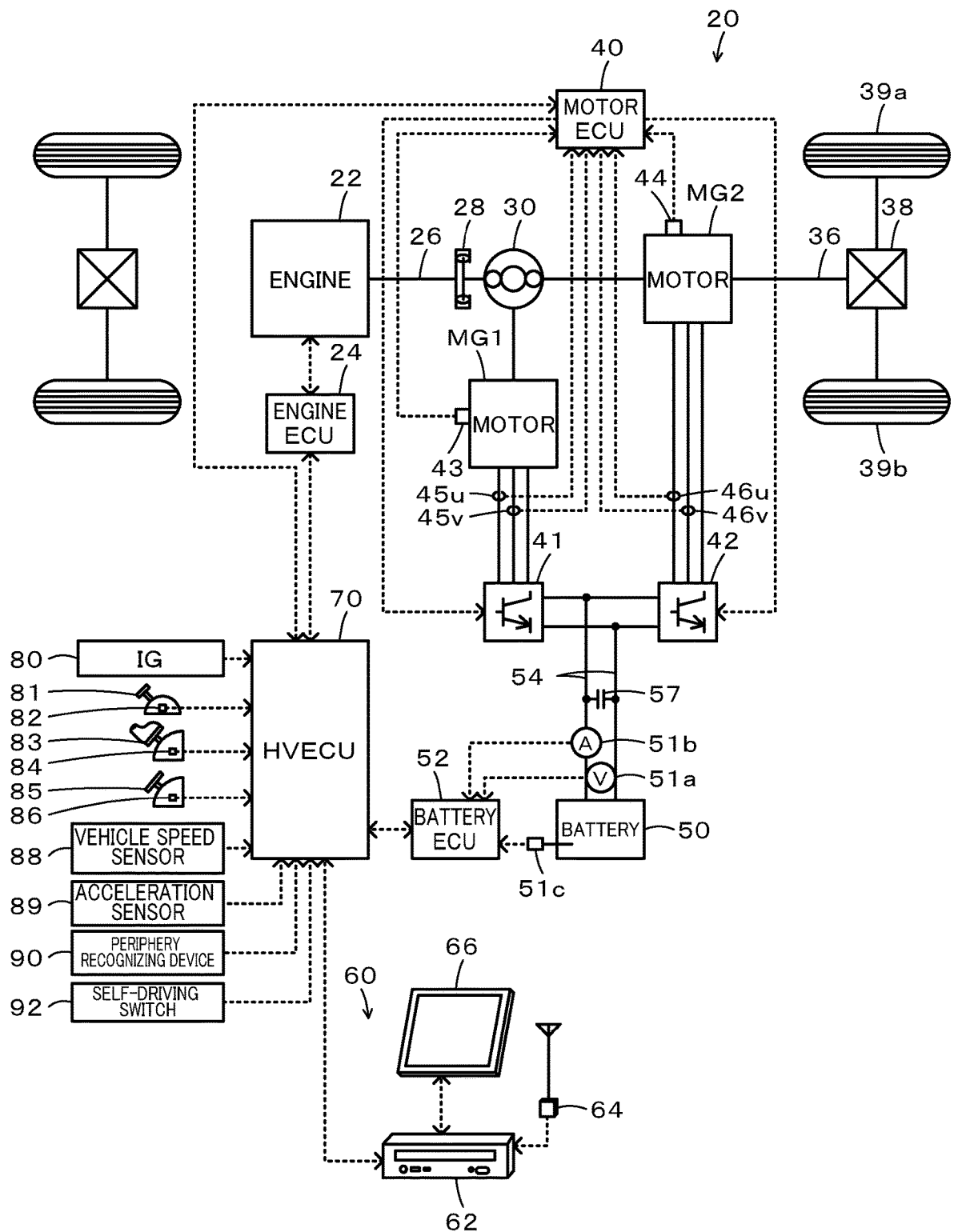
FIG. 1 is a configuration diagram illustrating the schematic configuration of a hybrid vehicle equipped with a vehicle control device according to a first embodiment of the present disclosure.
Figure 2:
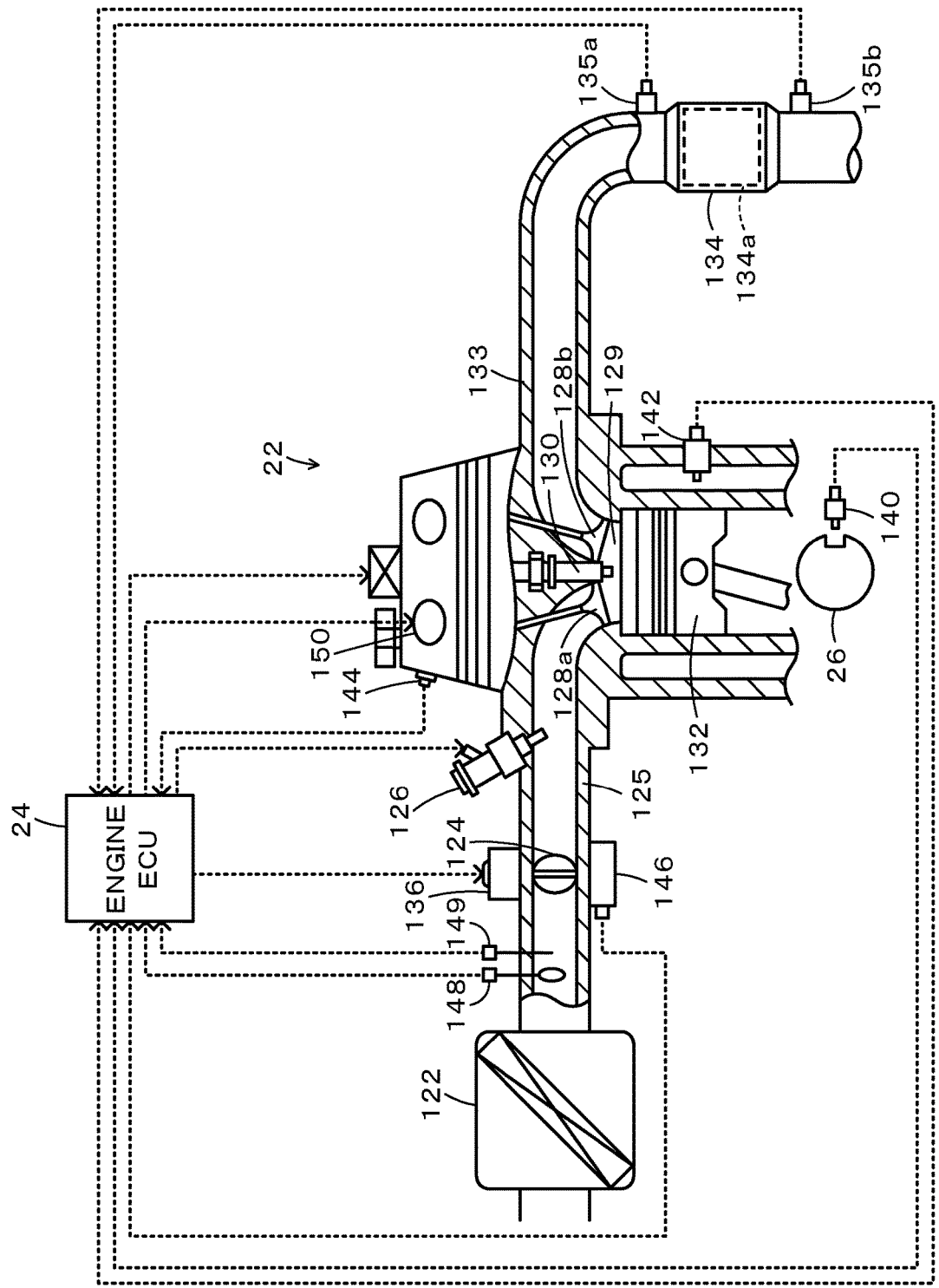
FIG. 2 is a configuration diagram illustrating the schematic configuration of an engine.

FIG. 1 is a configuration diagram illustrating the schematic configuration of a hybrid vehicle 20 equipped with a vehicle control device according to a first embodiment of the present disclosure. And FIG. 2 is a configuration diagram illustrating the schematic configuration of an engine 22. As shown in FIG. 1, the hybrid vehicle 20 of the first embodiment includes an engine 22, a planetary gear 30, motors MG1 and MG2, inverters 41 and 42, a battery 50 serving as the power storage device, a navigation system 60 and a hybrid electronic control unit (hereinafter referred to as "HVECU") 70.

The engine 22 is configured as an internal combustion engine that outputs power using, for example, gasoline or light oil as a fuel and is connected with a carrier of the planetary gear 30 via a damper 28. In this engine 22, as shown in FIG. 2, the air is cleaned by an air cleaner 122 and taken in via a throttle valve 124 provided in an intake pipe 125 is mixed with the fuel injected from a fuel injection valve 126. The air-fuel mixture is taken into a combustion chamber 129 via an intake valve 128a and is explosively combusted with an electric spark provided by a spark plug 130. The reciprocating motion of a piston 132 that is pressed down by the energy of the explosive combustion is converted into rotating motion of a crankshaft 26. The exhaust emission discharged from the combustion chamber 129 to an exhaust pipe 133 via an exhaust valve 128b is released to the outside air through an exhaust emission control device 134 filled with a catalyst (three-way catalyst) 134a serving to convert toxic components such as carbon monoxide (CO), hydrocarbons (HC) and nitrogen oxides (NOx) into less toxic components.

This engine 22 is operated and controlled by an engine electronic control unit (hereinafter referred to as "engine ECU") 24. The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22 are input into the engine ECU 24 via the input port. The signals input into the engine ECU 24 include, for example, a crank angle $\theta$cr from a crank position sensor 140 configured to detect the rotational position of the crankshaft 26 and a cooling water temperature Tw from a water temperature sensor 142 configured to detect the temperature of cooling water of the engine 22. The input signals also include cam angles $\theta$ci and $\theta$co from a cam position sensor 144 configured to detect the rotational position of an intake cam shaft that is provided to open and close the intake valve 128$a$ and to detect the rotational position of an exhaust cam shaft that is provided to open and close the exhaust valve 128$b$. The input signals further include a throttle position TH from a throttle valve position sensor 146 configured to detect the position of the throttle valve 124, an intake air flow Qa from an air flowmeter 148 mounted to the intake pipe 125, and an intake air temperature Ta from a temperature sensor 149 mounted to the intake pipe 125. The input signals additionally include an air-fuel ratio AF from an air-fuel ratio sensor 135$a$ mounted on an upstream side of the exhaust emission control device 134 in the exhaust pipe 133 and an oxygen signal O2 from an oxygen sensor 135$b$ mounted on a downstream side of the exhaust emission control device 134. Various control signals for operation control of the engine 22 are output from the engine ECU 24 via the output port. The signals output from the engine ECU 24 include, for example, a driving control signal to a throttle motor 136 provided to adjust the position of the throttle valve 124, a driving control signal to the fuel injection valve 126, a driving control signal to the spark plug 130, and a driving control signal to a variable valve timing mechanism 150 configured to vary the open-close timing of the intake valve 128$a$. The engine ECU 24 is connected with the HVECU 70 via the respective communication ports. The engine ECU 24 calculates a rotation speed Ne of the engine 22, based on the crank angle $\theta$ci input from the crank position sensor 140. The engine ECU 24 also calculates an open-close timing VT of the intake valve 128$a$, based on an angle difference ($\theta$ci−$\theta$cr) between the cam angle $\theta$ci of the intake cam shaft input from the cam position sensor 144 and the crank angle $\theta$ci input from the crank position sensor 140. Furthermore, the engine ECU 24 estimates a temperature Tc of the catalyst 134$a$ (catalyst temperature Tc) in the exhaust emission control device 134, based on the cooling water temperature Tw input from the water temperature sensor 142.

As shown in FIG. 1, the planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39$a$ and 39$b$ via a differential gear 38. The planetary gear 30 further includes a carrier that is connected with the crankshaft 26 of the engine 22 via the damper 28.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are used to respectively drive the motors MG1 and MG2 and are connected with the battery 50 via power lines 54. A capacitor 57 for smoothing is mounted to the power lines 54. A motor electronic control unit (hereinafter referred to as "motor ECU") 40 performs switching control of a plurality of switching elements (not shown) respectively included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2 are input into the motor ECU 40 via the input port. The signals input into the motor ECU 40 include, for example, rotational positions $\theta$m1 and $\theta$m2 from rotational position detection sensors 43 and 44 configured to detect the rotational positions of the respective rotors of the motors MG1 and MG2 and phase currents Iu1, Iv1, Iu2 and Iv2 from current sensors 45$u$, 45$v$, 46$u$ and 46$v$ configured to detect electric currents flowing in the respective phases of the motors MG1 and MG2. The motor ECU 40 outputs via the output port, for example, switching control signals to the plurality of switching elements included in the respective inverters 41 and 42. The motor ECU 40 is connected with the HVECU 70 via the respective communication ports. The motor ECU 40 calculates electrical angles $\theta$e1 and $\theta$e2, angular velocities m1 and =m2 and rotation speeds Nm1 and Nm2 of the respective motors MG1 and MG2, based on the rotational positions $\theta$m1 and $\theta$m2 of the respective rotors of the motors MG1 and MG2 input from the rotational position detection sensors 43 and 44.

The battery 50 may be configured as, for example, a lithium ion rechargeable battery or a nickel metal hydride battery. This battery 50 is connected with the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51$a$ placed between terminals of the battery 50, an electric current Ib of the battery 50 from a current sensor 51$b$ mounted to an output terminal of the battery 50, and a temperature Tb of the battery 50 from a temperature sensor 51$c$ mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51$b$. The battery ECU 52 also calculates an input limit Win and an output limit Wout, based on the calculated state of charge SOC and the temperature Tb of the battery 50 input from the temperature sensor 51$c$. The state of charge SOC denotes a ratio of the capacity of electric power dischargeable from the battery 50 to the overall capacity of the battery 50. The input limit Win and the output limit Wout denote an allowable charging power and an allowable discharging power that are chargeable into and dischargeable from the battery 50.

The navigation system 60 includes a main body 62 provided with a built-in storage medium such as a hard disk drive, in which map information and the like are stored, and with a built-in controller having input/output ports and a communication port; a GPS antenna 64 provided to receive information regarding the current location of the own vehicle; and a touch panel display 66 configured to display various information, such as information regarding the current location of the own vehicle and an estimated driving route to a destination, and to allow the user to enter various instructions. The map information is stored in the form of a database and includes service information (for example, tourism information and parking places) and road information of respective driving intervals (for example, intervals between traffic lights and intervals between intersections). The road information includes distance information, road width information, number of lanes information, district information (urban or suburban), road type information (for example, general road or expressway), road slope information, legal speed limits, and the number of traffic lights. The navigation system 60 is connected with the HVECU 70 via the respective communication ports.

When the user sets a destination through operations on the display 66, the main body 62 of the navigation system 60 sets an estimated driving route from the current location of the vehicle to the destination, based on the map information stored in the main body 62, the current location of the own vehicle from the GPS antenna 64 and the destination, displays the set estimated driving route on the display 66, and performs route guidance.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, a vehicle speed V from a vehicle speed sensor 88, and an acceleration α from an acceleration sensor 89. The input signals further include inter-vehicle distances D1 and D2 between the own vehicle and a vehicle ahead of the own vehicle and between the own vehicle and a vehicle behind the own vehicle from a periphery recognizing device 90 and a switch signal from a self-driving switch 92 operated to give an instruction for a self-driving mode. The periphery recognizing device 90 is configured by, for example, a camera, a millimeter wave radar, a submillimeter wave radar, an infrared laser radar or a sonar. The HVECU 70 is connected with the engine ECU 24, the motor ECU 40 and the battery ECU 52 via the respective communication ports as described above. According to the first embodiment, an ON operation of the self-driving switch 92 is permitted when the destination (expected driving route) is set, while being prohibited when no destination is set.

The "vehicle control device" of the first embodiment corresponds to the engine ECU 24, the motor ECU 40 and the HVECU 70.

The vehicle control device mounted on the hybrid vehicle 20 of the first embodiment having the configuration described above controls the engine 22 and the motors MG1 and MG2 such as to change over the drive of the hybrid vehicle 20 between motor drive (EV drive) in which the hybrid vehicle 20 is driven without operation of the engine 22 and hybrid drive (HV drive) in which the hybrid vehicle 20 is driven with operation of the engine 22, by cooperative control of the HVECU 70, the engine 24 and the motor ECU 40. The following describes the EV drive and the HV drive in an ordinary drive mode (when the self-driving switch 92 is OFF) and the EV drive and the HV drive in the self-driving mode (when the self-driving switch 92 is ON).

In the EV drive in the ordinary drive mode, the HVECU 70 first sets a required torque Td* that is required for driving (that is required for the driveshaft 36), based on the accelerator position Acc from the accelerator pedal position sensor 84 and the vehicle speed V from the vehicle speed sensor 88, and sets a required power Pd* that is required for driving (that is required for the driveshaft 36) by multiplying the set required torque Td* by a rotation speed of the driveshaft 36. The rotation speed of the driveshaft 36 used is the rotation speed Nm2 of the motor MG2 input from the motor ECU 40 by communication. The HVECU 70 subsequently sets a torque command Tm1* of the motor MG1 to a value 0 and sets a torque command Tm2* of the motor MG2 such that the required torque Td* (required power Pd*) is output to the driveshaft 36 to a range the input limit Win and the output limit Wout of the battery 50 input from the battery 50 by communication. The HVECU 70 then sends the torque commands Tm1* and Tm2* of the motors MG1 and MG2 to the motor ECU 40. When receiving the torque commands Tm1* and Tm2* of the motors MG1 and MG2, the motor ECU 40 performs switching control of the plurality of switching elements included in the inverters 41 and 42, such that the motors MG1 and MG2 are driven with the torque commands Tm1* and Tm2*. When the required torque Td* becomes equal to or higher than a starting reference value Tst in this EV drive, the HVECU 70 determines that a start condition of the engine 22 is met, starts the engine 22, and shifts the drive of the hybrid vehicle 20 to the HV drive.

More specifically, the HVECU 70 causes a cranking torque Tcr to be output from the motor MG1 to a range the input limit Win and the output limit Wout of the battery 50 and to crank the engine 22, causes a total torque of the required torque Td* and a cancellation torque Tcn to be output from the motor MG2, and starts fuel injection control and ignition control of the engine 22 when the rotation speed Ne of the engine 22 becomes equal to or higher than a reference value Nst, so as to start the engine 22. The cancellation torque Tcn denotes a torque to cancel a torque that is applied to the driveshaft 36 via the planetary gear 30 by output of the cranking torque Tcr from the motor MG1. The reference value Nst used may be, for example, 600 rpm, 700 rpm or 800 rpm.

The starting reference value Tst used is the lower between a torque T1 obtained by dividing a power P1 by the rotation speed of the driveshaft 36 (rotation speed Nm2 of the motor MG2) and a torque T2. The power P1 is given as a relatively high power expected such that a sum of the required power Pd* and a starting power required to start the engine 22 is within the range of the input limit Win and the output limit Wout of the battery 50. This power P1 may be a fixed value or may be a value determined such that the lower power P1 is provided at the higher rotation speed of the driveshaft 36 or more specifically such that the power P1 decreases with an increase in the rotation speed of the driveshaft 36. The latter setting takes into account that an increase in the rotation speed of the driveshaft 36 increases the magnitude of the negative rotation speed Nm1 of the motor MG1 and decreases the power consumption of the motor MG1 in the process of starting the engine 22. The torque T2 is given as a relatively high torque expected such that a sum of the required torque Td* and the cancellation torque Tcn in the process of starting the engine 22 is within a range of a rated torque of the motor MG2. This torque Tst may be a fixed value or may be a value determined such that the lower torque Tst is provided at the higher rotation speed of the driveshaft 36 or more specifically such that the torque Tst decreases with an increase in the rotation speed of the driveshaft 36. The latter setting takes into account that an increase in the rotation speed of the driveshaft 36 (an increase in the rotation speed Nm2 of the motor MG2) decreases the rated torque of the motor MG2. A modification may use the torque T1 as the starting reference value Tst without taking into account the torque T2 or may use the torque T2 as the starting reference value Tst without taking into account the torque T1.

In the HV drive in the ordinary drive mode, the HVECU 70 first sets the required torque Td* and the required power Pd*, as in the case of the EV drive in the ordinary drive mode. The HVECU 70 subsequently sets a required power Pe* that is required for the vehicle (that is required for the engine 22) by subtracting a charge-discharge required power Pb* (which takes a positive value when the battery 50 is discharged) based on the state of charge SOC of the battery 50, from the required power Pd*. The HVECU 70 subsequently sets a target rotation speed Ne* and a target torque Te* of the engine 22 and the torque commands Tm1* and Tm2* of the motors MG1 and MG2, such that the required power Pe* is output from the engine 22 and that the required torque Td* (required power Pd*) is output to the driveshaft 36 in the range of the input limit Win and the output limit Wout of the battery 50. After setting the target rotation speed Ne* and the target torque Te* of the engine 22 and the torque commands Tm1* and Tm2* of the motors MG1 and MG2, the HVECU 70 sends the target rotation speed Ne* and the target torque Te* of the engine 22 to the engine ECU 24, while sending the torque commands Tm1* and Tm2* of the motors MG1 and MG2 to the motor ECU 40. When receiving the target rotation speed Ne* and the target torque Te* of the engine 22, the engine ECU 24 performs operation control of the engine 22 (for example, intake air flow control, fuel injection control and ignition control), such that the engine 22 is operated with the target rotation speed Ne* and the target torque Te*. The motor ECU 40 controls the inverters 41 and 42 as described above. When the required torque Td* becomes lower than a stop reference value Tsp that is equal to or lower than the starting reference value Tst, in this HV drive, the HVECU 70 determines that a stop condition of the engine 22 is met, stops the operation of the engine 22 and shifts the drive of the hybrid vehicle 20 to the EV drive. It is preferable to provide the starting reference value Tst and the stop reference value Tsp with hysteresis, in order to suppress frequent starts and stops of the engine 22.

The EV drive and the HV drive in the self-driving mode are performed similarly to the EV drive and the HV drive in the ordinary drive mode, except that a different method is employed to set the required torque Td*. In the case of setting the required torque Td* in the self-driving mode, irrespective of the EV drive or the HV drive, the HVECU 70 sets a target vehicle speed V*, based on the expected driving route, the current location of the own vehicle and the map information (for example, the legal speed limits) from the navigation system 60 and the inter-vehicle distances D1 and D2 between the own vehicle and the vehicle ahead of the own vehicle and between the own vehicle and the vehicle behind the own vehicle (when there is any other vehicle around the own vehicle) from the periphery recognizing device 90, sets a tentative required torque Tdtmp such that the vehicle speed V becomes equal to the target vehicle speed V*, and sets the required torque Td* based on the set tentative required torque Tdtmp. In the self-driving mode, the HVECU 70 also controls a steering device (not shown) to keep the lane or to change the lane, based on the expected driving route, the current location of the own vehicle and the map information from the navigation system 60.

Figure 3:
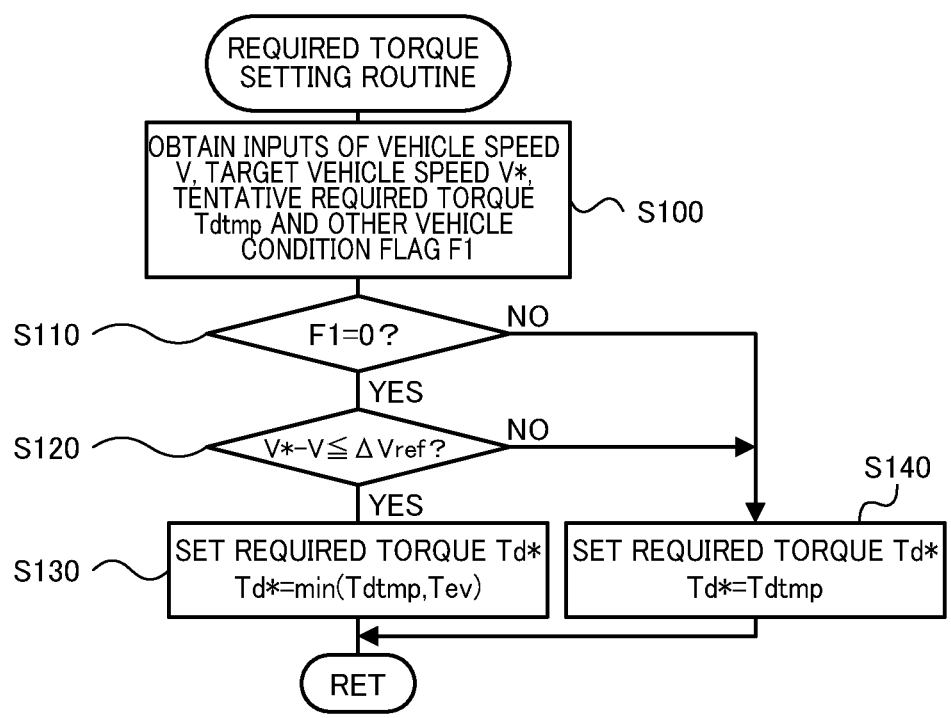
FIG. 3 is a flowchart showing one example of a required torque setting routine performed by an HVECU.

The following describes the operations of the hybrid vehicle 20 of the first embodiment having the configuration described above or more specifically a series of operations to set the required torque Td* in the EV drive in the self-driving mode (when the self-driving switch 92 is ON). FIG. 3 is a flowchart showing one example of a required torque setting routine performed by the HVECU 70. This routine is performed repeatedly during the EV drive in the self-driving mode. According to the first embodiment, the tentative required torque Tdtmp is set to the required torque Td* in the HV drive in the self-driving mode.

When the required torque setting routine of FIG. 3 is triggered, the HVECU 70 first obtains the inputs of the vehicle speed V, the target vehicle speed V*, the tentative required torque Tdtmp and an other vehicle condition flag F1 (step S100). The input vehicle speed V is a value detected by the vehicle speed sensor 88. The input target vehicle speed V* and the input tentative required torque Tdtmp are values set by the above series of processing. The input other vehicle condition flag F1 has been set to a value 1 upon satisfaction of an other vehicle condition that any other vehicle is present in a predetermined distance at least either ahead of the own vehicle or behind the own vehicle, while having been set to a value 0 upon non-satisfaction of the other vehicle condition. The predetermined distance is specified as a boundary distance for determining whether there is a need to take into account driving of any other vehicle in the self-driving mode. The predetermined distance may be a fixed value that is determined in a range of about several tens m to several hundreds m or may be a value determined such that the longer predetermined distance is provided at the higher vehicle speed V or more specifically such that the predetermined distance increases with an increase in the vehicle speed V.

After obtaining the input data, the HVECU 70 subsequently checks the setting of the other vehicle condition flag F1 (step S110). When the other vehicle condition flag F1 is equal to the value 0, the HVECU 70 determines that the other vehicle condition is not met and compares a value (V*−V) obtained by subtracting the vehicle speed V from the target vehicle speed V* with a reference value ΔVref (step S120). The reference value ΔVref denotes a reference value used to determined whether a certain level of acceleration is required or not and may be, for example, about ten-odd km/h to several tens km/h.

When it is determined at step S110 that the other vehicle condition flag F1 is equal to the value 0 and it is determined at step S120 that the value (V*−V) is equal to or smaller than the reference value ΔVref, the HVECU 70 determines that the other vehicle condition is not met and that there is no requirement for a certain level of acceleration, sets the required torque Td* based on an upper limit of the tentative required torque Tdtmp with a value Tev as given by Expression (1) below (step S130), and then terminates this routine. The value Tev is a value lower than the starting reference value Tst or more specifically a value slightly lower than the starting reference value Tst. This series of processing restricts the required torque Td* to a range lower than the starting reference value Tst (continues the EV drive). This improves the fuel consumption.

$$Td^* = \min(Tdtmp, Tev) \qquad (1)$$

When it is determined at step S110 that the other vehicle condition flag F1 is equal to the value 0 and it is determined at step S120 that the value (V*−V) is larger than the reference value ΔVref, the HVECU 70 determines that the other vehicle condition is not met and that there is a requirement for a certain level of acceleration, sets the tentative required torque Tdtmp to the required torque Td* (step S140) and then terminates this routine. This series of processing does not restrict the required torque Td* to a range lower than the starting reference value Tst which allows for a shift to the HV drive. This enhances the acceleration and causes the vehicle speed V to approach to the target vehicle speed V* more rapidly (within a shorter time period).

When it is determined at step S110 that the other vehicle condition flag F1 is equal to the value 1, the HVECU 70 determines that the other vehicle condition is met, sets the tentative required torque Tdtmp to the required torque Td* (step S140) and then terminates this routine. This series of processing does not restrict the required torque Td* to a range lower than the starting reference value Tst (allows for a shift to the HV drive). This enables the hybrid vehicle 20 to be driven in accordance with driving of other vehicles (for example, with keeping appropriate inter-vehicle distances).

In the EV drive in the self-driving mode, the vehicle control device mounted on the hybrid vehicle 20 of the first embodiment described above basically (when the value (V*−V) obtained by subtracting the vehicle speed V from the target vehicle speed V* is equal to or smaller than the reference value ΔVref) restricts the required torque Td* to a range lower than the starting reference value Tst (continues the EV drive) upon non-satisfaction of the other vehicle condition, while not restricting the required torque Td* to the range lower than the starting reference value Tst (allowing for a shift to the HV drive) upon satisfaction of the other vehicle condition. This configuration improves the fuel consumption in the former case, while enabling the hybrid vehicle 20 to be driven in accordance with driving of other vehicles (for example, with keeping appropriate inter-vehicle distances) in the latter case. As a result, this configuration ensures the more appropriate self-driving based on the circumstances around the own vehicle.

Additionally, upon non-satisfaction of the other vehicle condition in the EV drive in the self-driving mode, the vehicle control device mounted on the hybrid vehicle 20 of the first embodiment does not restrict the required torque Td* to the range lower than the starting reference value Tst (allows for a shift to the HV drive), when the value (V*−V) is larger than the reference value ΔVref. This enhances the acceleration and causes the vehicle speed V to approach to the target vehicle speed V* more rapidly (within a shorter time period).

Upon non-satisfaction of the other vehicle condition in the EV drive in the self-driving mode, the vehicle control device mounted on the hybrid vehicle 20 of the first embodiment restricts the required torque Td* to the range lower than the starting reference value Tst (continues the EV drive) when the value (V*−V) is equal to or smaller than the reference value ΔVref, while not restricting the required torque Td* to the range lower than the starting reference value Tst (allowing for a shift to the HV drive) when the value (V*−V) is larger than the reference value ΔVref. According to a modification, upon non-satisfaction of the other vehicle condition in the EV drive in the self-driving mode, the required torque Td* may be restricted to the range lower than the starting reference value Tst, irrespective of the magnitude relationship between the value (V*−V) and the reference value ΔVref.

The vehicle control device mounted on the hybrid vehicle 20 of the first embodiment and configured to shift the drive of the hybrid vehicle 20 to the HV drive when the required torque Td* becomes equal to or higher than the starting reference value Tst during the EV drive determines whether the required torque Td* is to be restricted to the range lower than the starting reference value Tst (determines whether to continue the EV drive or to allow for a shift to the HV drive) in the EV drive in the self-driving mode, based on satisfaction or non-satisfaction of the other vehicle condition (setting of the other vehicle condition flag F1) and the magnitude relationship between the value (V*−V) and the reference value ΔVref. According to a modification, the vehicle control device may be configured to shift the drive of the hybrid vehicle 20 to the HV drive when the required power Pd* becomes equal to or larger than a starting reference value Pst during the EV drive and may determine whether the required power Pd* is to be restricted to a range smaller than the starting reference value Pst in the EV drive in the self-driving mode, based on satisfaction or non-satisfaction of the other vehicle condition and the magnitude relationship between the value (V*−V) and the reference value ΔVref. According to another modification, the vehicle control device may be configured to shift the drive of the hybrid vehicle 20 to the HV drive when the vehicle speed V becomes equal to or higher than a starting reference value Vst during the EV drive and may determine whether the motor MG2 is to be controlled or not such as to restrict the vehicle speed V to a range lower than the starting reference value Vst in the EV drive in the self-driving mode, based on satisfaction or non-satisfaction of the other vehicle condition and the magnitude relationship between the value (V*−V) and the reference value ΔVref. According to another modification, the vehicle control device may be configured to shift the drive of the hybrid vehicle 20 to the HV drive when the acceleration α becomes equal to or higher than a starting reference value αst during the EV drive and may determine whether the motor MG2 is to be controlled or not such as to restrict the acceleration α to a range lower than the starting reference value αst in the EV drive in the self-driving mode, based on satisfaction or non-satisfaction of the other vehicle condition and the magnitude relationship between the value (V*−V) and the reference value ΔVref. Any of these modifications may take into account only satisfaction or non-satisfaction of the other vehicle condition, while not taking into account the magnitude relationship between the value (V*−V) and the reference value ΔVref.

Figure 4:
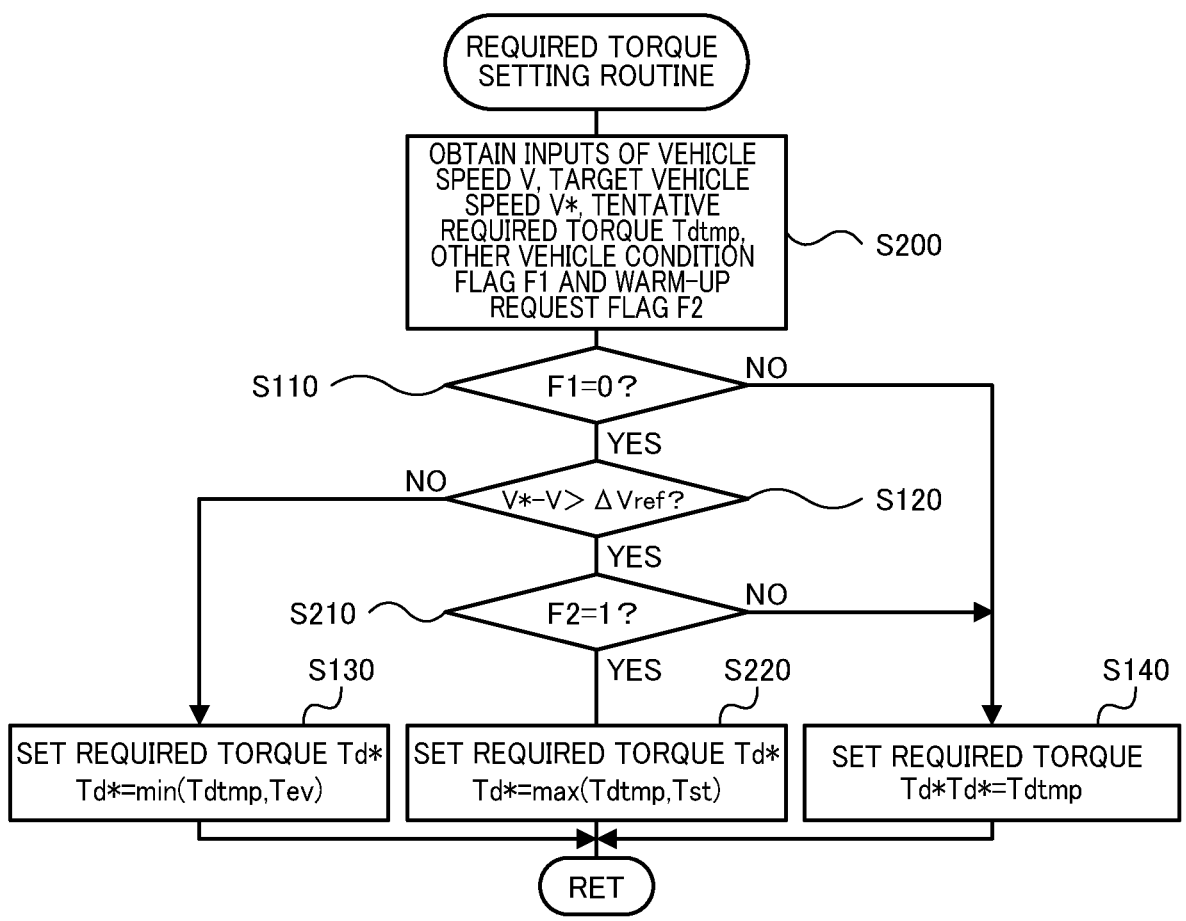
FIG. 4 is a flowchart showing a required torque setting routine according to a modification.

In the vehicle control device mounted on the hybrid vehicle 20 of the first embodiment, the HVECU 70 performs the required torque setting routine of FIG. 3 in the EV drive in the self-driving mode. Another required torque setting routine shown in FIG. 4 may be performed alternatively. The required torque setting routine of FIG. 4 is similar to the required torque setting routine of FIG. 3, except replacement of the processing of step S100 with the processing of step S200 and addition of the processing of steps S210 and S220. The like processing steps are expressed by the like step numbers, and their detailed description is omitted.

In the required torque setting routine of FIG. 4, the HVECU 70 first obtains the input of a warm-up request flag F2, in addition to the inputs of the vehicle speed V, the target vehicle speed V*, the tentative required torque Tdtmp and the other vehicle condition flag F1 like the processing of step S100 in the required torque setting routine of FIG. 3 (step S200). The warm-up request flag F2 is set equal to a value 1 when there is a warm-up request for the engine 22 or a warm-up request for the catalyst 134a, while being set to a value 0 when there is neither the warm-up request for the engine 22 nor the warm-up request for the catalyst 134a. The presence or the absence of the warm-up request for the engine 22 is determined, based on the cooling water temperature Tw of the engine 22. The presence or the absence of the warm-up request for the catalyst 134a is determined, based on the temperature Tc of the catalyst 134a (catalyst temperature Tc).

When it is determined at step S110 that the other vehicle condition flag F1 is equal to the value 0 and it is determined at step S120 that the value (V*−V) is larger than the reference value ΔVref, the HVECU 70 determines that the other vehicle condition is not met and that there is a requirement for a certain level of acceleration and checks the setting of the warm-up request flag F2 (step S210). When the warm-up request flag F2 is equal to the value 0, the HVECU 70 determines that there is neither the warm-up request for the engine 22 nor the warm-up request for the catalyst 134a, sets the tentative required torque Tdtmp to the required torque Td* (step S140) and then terminates this routine.

When the warm-up request flag F2 is equal to the value 1 at step S210, the HVECU 70 determines that there is the warm-up request for the engine 22 or the warm-up request for the catalyst 134a, sets the required torque Td* based on a lower limit of the tentative required torque Tdtmp with the starting reference value Tst as given by Expression (2) below (step S220), and then terminates this routine.

$$Td^* = \max(Tdmp, Tsp) \quad (2)$$

This series of processing causes the required torque Td* to become equal to or higher than the starting reference value Tst, starts the engine 22 and shifts the drive of the hybrid vehicle 20 to the HV drive. This allows the engine 22 and the catalyst 134a to be warmed up. In this modification, after a shift to the HV drive, the required torque Td* is set by lower limit guarding the tentative required torque Tdtmp with a stop reference value Tsp and upper limit guarding the tentative required torque Tdtmp with a sum of the stop reference value Tsp and a margin ΔTsp as given by Expression (3) below, when there is the warm-up request for the engine 22 or the warm-up request for the catalyst 134a. This continues the HV drive and continues warming up the engine 22 and warming up the catalyst 134a, while suppressing an increase in required power Pe* according to the required power Pd* based on the required torque Td* and suppressing poor emission of the engine 22. When there is neither the warm-up request for the engine 22 nor the warm-up request for the catalyst 134a, the tentative required torque Tdtmp is set to the required torque Td*. This allows for output of large power from the engine 22 and allows for a shift to the EV drive.

$$Td^* = \min(\max(Tdtmp, Tsp), Tsp + \Delta Tsp) \quad (3)$$

In the case where the value (V*−V) is larger than the reference value ΔVref upon non-satisfaction of the other vehicle condition in the EV drive in the self-driving mode, the vehicle control device mounted on the hybrid vehicle 20 of this modification sets the required torque Td* equal to or higher than the starting reference value Tst when there is the warm-up request for the engine 22 or the warm-up request for the catalyst 134a. This starts the engine 22, shifts the drive of the hybrid vehicle 20 to the HV drive and performs warm-up of the engine 22 and warm-up of the catalyst 134a.

Upon non-satisfaction of the other vehicle condition in the EV drive in the self-driving mode, the vehicle control device mounted on the hybrid vehicle 20 according to this modification sets the required torque Td* equal to or higher than the starting reference value Tst when the value (V*−V) is larger than the reference value ΔVref and there is the warm-up request for the engine 22 or the warm-up request for the catalyst 134a. According to a modification, when there is the warm-up request for the engine 22 or the warm-up request for the catalyst 134a upon non-satisfaction of the other vehicle condition in the EV drive in the self-driving mode, the required torque Td* may be set equal to or higher than the starting reference value Tst, irrespective of the magnitude relationship between the value (V*−V) and the reference value ΔVref.

The vehicle control device mounted on the hybrid vehicle 20 of this modification and configured to shift the drive of the hybrid vehicle 20 to the HV drive when the required torque Td* becomes equal to or higher than the starting reference value Tst during the EV drive sets the required torque Td* equal to or higher than the starting reference value Tst at a predetermined time when the value (V*−V) is larger than the reference value ΔVref and there is the warm-up request for the engine 22 or the warm-up request for the catalyst 134a upon non-satisfaction of the other vehicle condition in the EV drive in the self-driving mode. According to a modification, the vehicle control device may be configured to shift the drive of the hybrid vehicle 20 to the HV drive when the required power Pd* becomes equal to or larger than the starting reference value Pst during the EV drive and may set the required power Pd* equal to or greater than the starting reference value Pst at the predetermined time. According to another modification, the vehicle control device may be configured to shift the drive of the hybrid vehicle 20 to the HV drive when the vehicle speed V becomes equal to or higher than the starting reference value Vst during the EV drive and may control the motor MG2 to make the vehicle speed V equal to or higher than the starting reference value Vst. According to another modification, the vehicle control device may be configured to shift the drive of the hybrid vehicle 20 to the HV drive when the acceleration α becomes equal to or higher than the starting reference value αst during the EV drive and may control the motor MG2 to make the acceleration α equal to or higher than the starting reference value αst. Any of these modifications may not take into account the magnitude relationship between the value (V*−V) and the reference value ΔVref to determine whether the current condition is the predetermined time or not.

In the vehicle control device mounted on the hybrid vehicle 20 of the first embodiment, the HVECU 70 sets the tentative required torque Tdtmp to the required torque Td* in the HV drive in the self-driving mode. Another required torque setting routine shown in FIG. 5 may be used alternatively to set the required torque Td*. The required torque setting routine of FIG. 5 is performed repeatedly during the HV drive in the self-driving mode.

Figure 5:
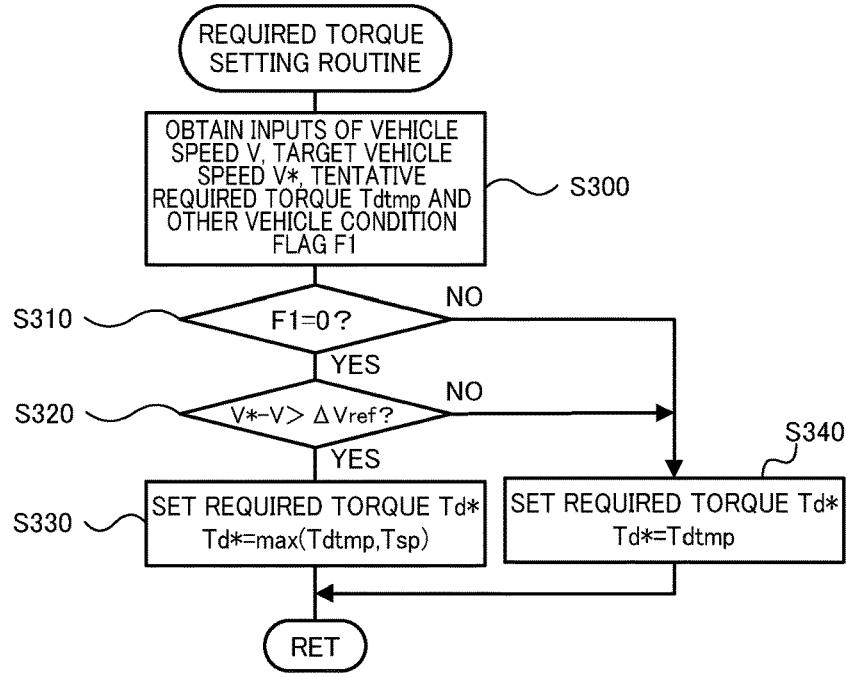
FIG. 5 is a flowchart showing a required torque setting routine according to another modification.

When the required torque setting routine of FIG. 5 is triggered, the HVECU 70 obtains the inputs of the vehicle speed V, the target vehicle speed V*, the tentative required torque Tdtmp and the other vehicle condition flag F1 (step S300) and checks the setting of the other vehicle condition flag F1 (step S310), like the processing of steps S100 and S110 in the required torque setting routine of FIG. 3. When the other vehicle condition flag F1 is equal to the value 0, the HVECU 70 determines that the other vehicle condition is not met and compares the value (V*−V) with the reference value ΔVref (step S320).

When it is determined at step S310 that the other vehicle condition flag F1 is equal to the value 0 and it is determined at step S320 that the value (V*−V) is larger than the reference value ΔVref, the HVECU 70 determines that the other vehicle condition is not met and that there is a requirement for a certain level of acceleration, sets the required torque Td* by lower limit guarding the tentative required torque Tdtmp with the stop reference value Tsp as given by Expression (4) (step S330) and then terminates this routine. This series of processing restricts the required torque Td* to a range equal to or larger than the stop reference value Tsp (continues the HV drive). This suppresses frequent starts and stops of the engine 22.

$$Td^* = \max(Tdtmp, Tsp) \quad (4)$$

When it is determined at step S310 that the other vehicle condition flag F1 is equal to the value 0 and it is determined at step S320 that the value (V*−V) is equal to or smaller than the reference value ΔVref, the HVECU 70 determines that the other vehicle condition is not met and that there is no requirement for a certain level of acceleration, sets the tentative required torque Tdtmp to the required torque Td* (step S340) and then terminates this routine. This series of processing does not restrict the required torque Td* to the range equal to or larger than the stop reference value Tsp (allows for a shift to the EV drive). This suppresses reduction of the fuel consumption due to continuation of the HV drive.

When it is determined at step S310 that the other vehicle condition flag F1 is equal to the value 1, the HVECU 70 determines that the other vehicle condition is met, sets the tentative required torque Tdtmp to the required torque Td* (step S340) and then terminates this routine. This series of processing does not restrict the required torque Td* to the range equal to or larger than the stop reference value Tsp (allows for a shift to the EV drive). This enables the hybrid vehicle 20 to be driven in accordance with driving of other vehicles (for example, with keeping appropriate inter-vehicle distances).

In the HV drive in the self-driving mode, the vehicle control device mounted on the hybrid vehicle 20 of the modification restricts the required torque Td* to the range equal to or larger than the stop reference value Tsp (continues the HV drive) when the other vehicle condition is not met and the value (V*−V) is larger than the reference value ΔVref, while not restricting the required torque Td* to the range equal to or larger than the stop reference value Tsp (allowing for a shift to the EV drive) when the other vehicle condition is met. This configuration suppresses frequent starts and stops of the engine 22 in the former case and enables the hybrid vehicle 20 to be driven in accordance with driving of other vehicles (for example, with keeping appropriate inter-vehicle distances) in the latter case. As a result, this configuration ensures the more appropriate self-driving based on the circumstances around the own vehicle.

Furthermore, in the HV drive in the self-driving mode, the vehicle control device mounted on the hybrid vehicle 20 of the modification does not restrict the required torque Td* to the range equal to or larger than the stop reference value Tsp (allows for a shift to the EV drive) when the other vehicle condition is not met and the value (V*−V) is equal to or smaller than the reference value ΔVref. This suppresses reduction of the fuel consumption due to continuation of the HV drive.

Upon non-satisfaction of the other vehicle condition in the HV drive in the self-driving mode, the vehicle control device mounted on the hybrid vehicle 20 of the modification restricts the required torque Td* to the range equal to or larger than the stop reference value Tsp (continues the HV drive) when the value (V*−V) is larger than the reference value ΔVref, while not restricting the required torque Td* to the range equal to or larger than the stop reference value Tsp (allowing for a shift to the EV drive) when the value (V*−V) is equal to or smaller than the reference value ΔVref. According to a modification, upon non-satisfaction of the other vehicle condition in the HV drive in the self-driving mode, the required torque Td* may be restricted to the range equal to or larger than the stop reference value Tsp, irrespective of the magnitude relationship between the value (V*−V) and the reference value ΔVref.

The vehicle control device mounted on the hybrid vehicle 20 of the modification and configured to shift the drive of the hybrid vehicle 20 to the EV drive when the required torque Td* becomes lower than the stop reference value Tsp during the HV drive determines whether the required torque Td* is to be restricted to the range equal to or larger than the stop reference value Tsp (determines whether to continue the HV drive or to allow for a shift to the EV drive) in the HV drive in the self-driving mode, based on satisfaction or non-satisfaction of the other vehicle condition (setting of the other vehicle condition flag F1) and the magnitude relationship between the value (V*−V) and the reference value ΔVref. According to a modification, the vehicle control device may be configured to shift the drive of the hybrid vehicle 20 to the EV drive when the required power Pd* becomes smaller than a stop reference value Psp during the HV drive and may determine whether the required power Pd* is to be restricted to a range equal to or larger than the stop reference value Psp in the HV drive in the self-driving mode, based on satisfaction or non-satisfaction of the other vehicle condition and the magnitude relationship between the value (V*−V) and the reference value ΔVref. According to another modification, the vehicle control device may be configured to shift the drive of the hybrid vehicle 20 to the EV drive when the vehicle speed V becomes lower than a stop reference value Vsp during the HV drive and may determine whether the engine 22 and the motors MG1 and MG2 are to be controlled or not such as to restrict the vehicle speed V to a range equal to or larger than the stop reference value Vsp in the HV drive in the self-driving mode, based on satisfaction or non-satisfaction of the other vehicle condition and the magnitude relationship between the value (V*−V) and the reference value ΔVref. According to another modification, the vehicle control device may be configured to shift the drive of the hybrid vehicle 20 to the EV drive when the acceleration α becomes lower than a stop reference value asp during the HV drive and may determine whether the engine 22 and the motors MG1 and MG2 are to be controlled or not such as to restrict the acceleration α to a range equal to or larger than the stop reference value asp in the HV drive in the self-driving mode, based on satisfaction or non-satisfaction of the other vehicle condition and the magnitude relationship between the value (V*−V) and the reference value ΔVref. Any of these modifications may take into account only satisfaction or non-satisfaction of the other vehicle condition, while not taking into account the magnitude relationship between the value (V*−V) and the reference value ΔVref.

Embodiment 2

The following describes a hybrid vehicle 20B according to a second embodiment of the present disclosure. The hybrid vehicle 20B of the second embodiment has an identical hardware configuration with that of the hybrid vehicle 20 of the first embodiment shown in FIG. 1 and FIG. 2. With a view to avoiding the duplicated description, the respective components included in the hardware configuration of the hybrid vehicle 20B of the second embodiment are expressed by the same reference signs as those of the hybrid vehicle 20 of the first embodiment, and their illustration and description are omitted.

Figure 6:
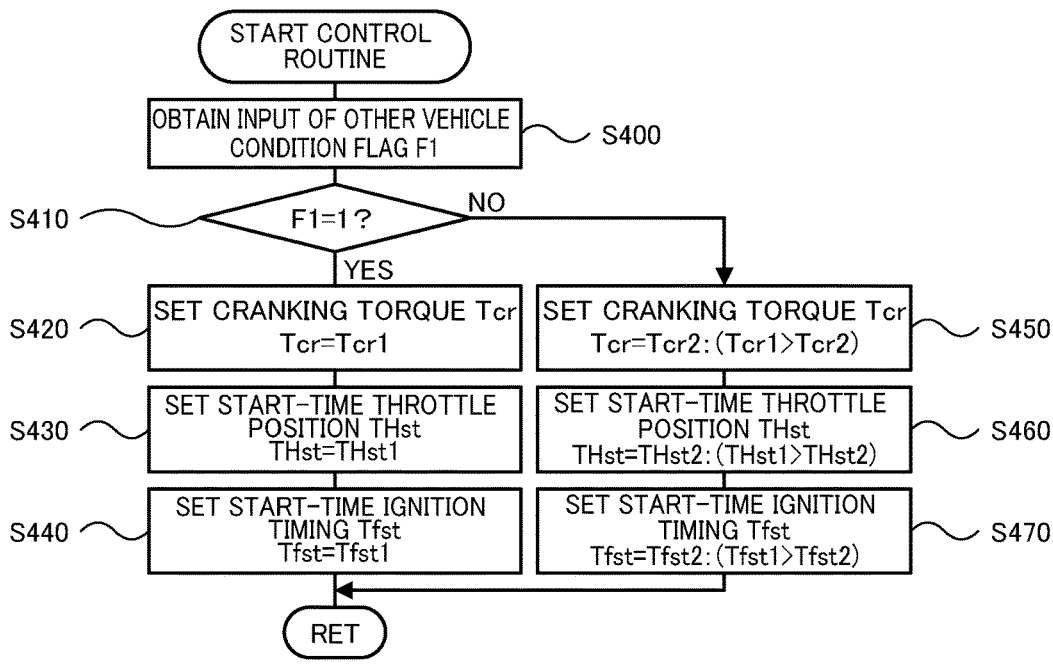
FIG. 6 is a flowchart showing one example of a start control routine performed by the HVECU according to a second embodiment of the present disclosure.

The following describes the operations of the hybrid vehicle 20B of the second embodiment or more specifically a series of operations to start the engine 22 in the self-driving mode. FIG. 6 is a flowchart showing one example of a start control routine performed by the HVECU 70. This routine is performed upon satisfaction of a start condition of the engine 22 during the EV drive in the self-driving mode.

When the start control routine of FIG. 6 is triggered, the HVECU 70 obtains the input of the other vehicle condition flag F1 (step S400) and checks the setting of the input other vehicle condition flag F1 (step S410). When the other vehicle condition flag F1 is equal to the value 1, the HVECU 70 determines that the other vehicle condition is met and sets a torque Tcr1 to the cranking torque Tcr (step S420). The HVECU 70 subsequently sets an opening position THst1 to a start-time throttle position THst that is the throttle position at the start of the engine 22 (step S430), sets a timing Tfst1 to a start-time ignition timing Tfst that is the ignition timing at the start of the engine 22 (step S440) and then terminates this routine. The torque Tcr1, the opening position THst1 and the timing Tfst1 are set with giving preference to the response over the reduction of starting shock. This configuration thus enables the engine 22 to be started quickly (in a short time period) and shifts the drive to the HV drive.

When the other vehicle condition flag F1 is equal to the value 0 at step S410, the HVECU 70 sets a torque Tcr2 that is smaller than the torque Tcr1, to the cranking torque Tcr (step S450), sets an opening position THst2 that is smaller than the opening position THst1, to the start-time throttle position THst (step S460), sets a timing Tfst2 that is later than the timing Tfst1, to the start-time ignition timing Tfst (step S470) and then terminates this routine. The torque Tcr2, the opening position THst2 and the timing Tfst2 are set with giving preference to the reduction of starting shock over the response. Decreasing the cranking torque Tcr provides a gradual increase in rotation of the engine 22 and thereby reduces the starting shock. Decreasing the start-time throttle position THst decreases the amount of the intake air of the engine 22 to reduce the compression and decrease the torque at the time of initial explosion and thereby reduces the starting shock. Delaying the start-time ignition timing Tfst slows combustion at the time of initial explosion and thereby reduces the starting shock.

In the process of starting the engine 22 in the self-driving mode, the vehicle control device mounted on the hybrid vehicle 20B of the second embodiment described above decreases the cranking torque Tcr, decreases the start-time throttle position THst and delays the start-time ignition timing Tfst when the other vehicle condition is not met, compared with those when the other vehicle condition is met. This configuration gives preference to the response over the reduction of starting shock when there is any other vehicle in the predetermined distance at least either ahead of the own vehicle or behind the own vehicle. This configuration gives preference to the reduction of starting shock over the response when the other vehicle condition is not met. As a result, this configuration ensures the more appropriate self-driving based on the circumstances around the own vehicle.

In the process of starting the engine 22 in the self-driving mode, the vehicle control device mounted on the hybrid vehicle 20B of the second embodiment decreases the cranking torque Tcr, decreases the start-time throttle position THst and delays the start-time ignition timing Tfst when the other vehicle condition is not met, compared with those when the other vehicle condition is met. According to a modification, in the process of starting the engine 22 in the self-driving mode, among decreasing the cranking torque Tcr, decreasing the start-time throttle position THst, and delaying the start-time ignition timing Tfst, only one or two may be performed when the other vehicle condition is not met, compared with those when the other vehicle condition is met.

The vehicle control device mounted on the hybrid vehicle 20 of the first embodiment or on the hybrid vehicle 20B of the second embodiment is configured to set the target vehicle speed V* and to set the required torque Td* based on the vehicle speedV and the target vehicle speedV* in the self-driving mode. According to a modification, the vehicle control device may be configured to set target inter-vehicle distances D1* and D2* and to set the required torque Td* based on the inter-vehicle distances D1 and D2 and the target inter-vehicle distances D1* and D2*. According to another modification, the vehicle control device may be configured to set a target acceleration α* and to set the required torque Td* based on the acceleration α and the target acceleration α*.

The hybrid vehicle 20 of the first embodiment and the hybrid vehicle 20B of the second embodiment use the battery 50 as the power storage device. The power storage device used may be a capacitor, in place of the battery 50.

The hybrid vehicle 20 of the first embodiment and the hybrid vehicle 20B of the second embodiment include the engine ECU 24, the motor ECU 40, the battery ECU 52 and the HVECU 70. At least two of these ECUs may be configured by a single electronic control unit.

Figure 7:
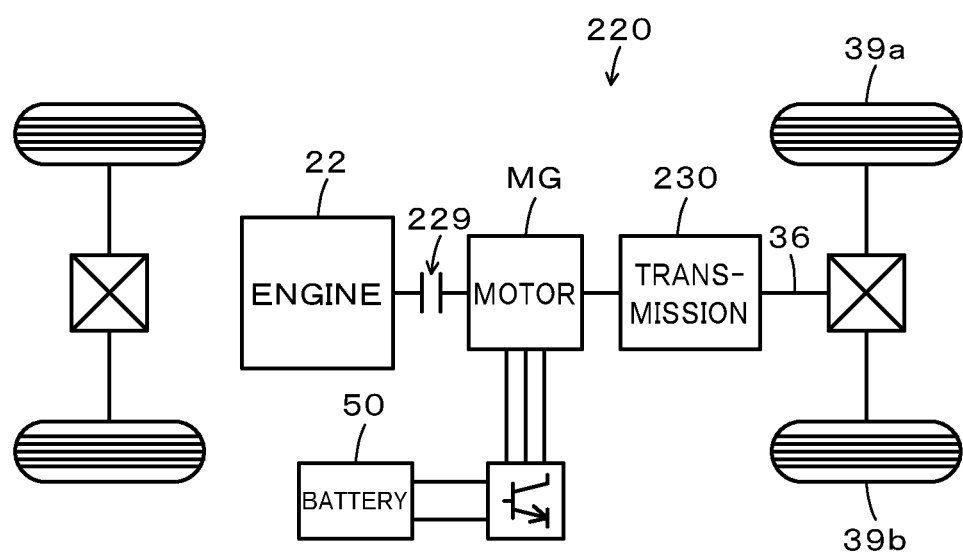
FIG. 7 is a configuration diagram illustrating the schematic configuration of a hybrid vehicle according to a modification.

The hybrid vehicle 20 of the first embodiment and the hybrid vehicle 20B of the second embodiment are configured such that the engine 22 and the motor MG1 are connected via the planetary gear 30 with the driveshaft 36 which is coupled with the drive wheels 39a and 39b, that the motor MG2 is connected with the driveshaft 36, and that the battery 50 is connected with the motors MG1 and MG2 via the power lines. The present disclosure may, however, be applicable to a one-motor hybrid vehicle configured such that a motor MG is connected via a transmission 230 with a driveshaft 36 which is coupled with drive wheels 39a and 39b, that an engine 22 is connected with the motor MG via a clutch 229, and that a battery 50 is connected with the motor MG via power lines, like a hybrid vehicle 220 of a modification shown in FIG. 7.

In the vehicle control device according to the first aspect of the present disclosure, upon non-satisfaction of the other vehicle condition in the motor drive in the self-driving mode, the vehicle control device may allow for a shift to the hybrid drive when a value obtained by subtracting a vehicle speed from a target vehicle speed is larger than a reference value. This configuration enhances the acceleration and causes the vehicle speed to approach to the target vehicle speed more rapidly (within a shorter time period).

In the first vehicle control device of the above aspect, upon non-satisfaction of the other vehicle condition in the motor drive in the self-driving mode, the vehicle control device may shift the drive of the hybrid vehicle to the hybrid drive when there is a requirement for warm-up of the engine or a requirement for warm-up of a catalyst placed in an exhaust system of the engine. This configuration performs warm-up of the engine and warm-up of the catalyst. According to a modification, upon non-satisfaction of the other vehicle condition in the motor drive in the self-driving mode, the vehicle control device of this aspect may be configured to shift the drive of the hybrid vehicle to the hybrid drive when there is a requirement for warm-up of the engine or a requirement for warm-up of the catalyst and the value obtained by subtracting the vehicle speed from the target vehicle speed is larger than the reference value.

In the vehicle control device according to the first aspect of the present disclosure, in the hybrid drive in the self-driving mode, the vehicle control device may maintain the hybrid drive when the other vehicle condition is not met, while allowing for a shift to the motor drive when the other vehicle condition is met. This configuration suppresses frequent starts and stops of the engine when the other vehicle condition is not met, while enabling the hybrid vehicle to be driven in accordance with driving of other vehicles (for example, with keeping appropriate inter-vehicle distances) when the other vehicle condition is met. According to a modification, in the hybrid drive in the self-driving mode, the vehicle control device of this aspect may be configured to maintain the hybrid drive when the other vehicle condition is not met and the value obtained by subtracting the vehicle speed from the target vehicle speed is larger than the reference value and to allow for a shift to the motor drive when the other vehicle condition is met or when the value obtained by subtracting the vehicle speed from the target vehicle speed is equal to or smaller than the reference value.

In the vehicle control device according to the second aspect of the present disclosure, upon non-satisfaction of the other vehicle condition in the motor drive in the self-driving mode, the vehicle control device may not restrict the parameter to the range smaller than the start reference value when a value obtained by subtracting a vehicle speed from a target vehicle speed is larger than a reference value. This configuration enhances the acceleration and causes the vehicle speed to approach the target vehicle speed more rapidly (within a shorter time period).

In the vehicle control device according to the second aspect of the present disclosure, upon non-satisfaction of the other vehicle condition in the motor drive in the self-driving mode, the vehicle control device may cause the parameter to be equal to or larger than the start reference value when there is a requirement for warm-up of the engine or a requirement for warm-up of a catalyst placed in an exhaust system of the engine. This configuration allows for a shift to the hybrid drive and performs warm-up of the engine and warm-up of the catalyst. According to a modification, upon non-satisfaction of the other vehicle condition in the motor drive in the self-driving mode, the vehicle control device of this aspect may be configured to cause the parameter to be equal to or larger than the start reference value when there is a requirement for warm-up of the engine or a requirement for warm-up of the catalyst and the value obtained by subtracting the vehicle speed from the target vehicle speed is larger than the reference value.

In the vehicle control device according to the second aspect of the present disclosure, when the parameter becomes smaller than a stop reference value of the engine that is equal to or smaller than the start reference value during the hybrid drive, the vehicle control device may stop operation of the engine and shift the drive of the hybrid vehicle to the motor drive, and in the hybrid drive in the self-driving mode, the vehicle control device may restrict the parameter to a range equal to or larger than the stop reference value when the other vehicle condition is not met, while not restricting the parameter to the range equal to or larger than the stop reference value when the other vehicle condition is met. This configuration maintains the hybrid drive and suppresses frequent starts and stops the engine when the other vehicle condition is not met, while allowing for a shift to the motor drive and enabling the hybrid vehicle to be driven in accordance with driving of other vehicles (for example, with keeping appropriate inter-vehicle distances) when the other vehicle condition is met. According to a modification, in the hybrid drive in the self-driving mode, the vehicle control device of this aspect may be configured to restrict the parameter to the range equal to or larger than the stop reference value when the other vehicle condition is not met and the value obtained by subtracting the vehicle speed from the target vehicle speed is larger than the reference value and not to restrict the parameter to the range equal to or larger than the stop reference value when the other vehicle condition is met or when the value obtained by subtracting the vehicle speed from the target vehicle speed is equal to or smaller than the reference value.

In the vehicle control device according to the third aspect of the present disclosure, the second start control may be a control of decreasing a cranking torque when the engine is cranked by the motor, compared with the first start control. The second start control may also be a control of decreasing a throttle position when the engine is cranked by the motor, compared with the first start control. Additionally, the second start control may be a control of delaying an ignition timing of the engine, compared with the first start control. This configuration more appropriately gives preference to the reduction of starting shock over the response, when the other vehicle condition is not met.

The following describes the correspondence relationship between the primary elements of the above embodiment and the primary elements of the disclosure described in Summary. The engine 22 of the first and second embodiment corresponds to the "engine", the motor MG2 corresponds to the "motor", the battery 50 corresponds to the "power storage device", the engine ECU 24, the motor ECU 40 and the HVECU 70 correspond to the "vehicle control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of vehicle control devices.

What is claimed is:

1. A vehicle control device mounted on a hybrid vehicle including an engine, a motor and a power storage device that transmits power to and from the motor and configured to control the engine and the motor such as to drive the hybrid vehicle while changing over between motor drive without operation of the engine and hybrid drive with operation of the engine, wherein
in the motor drive in a self-driving mode where the hybrid vehicle is driven independently of a driver's accelerating operation or decelerating operation,
the vehicle control device maintains the motor drive when a vehicle condition is not met, where the vehicle condition is a condition where any other vehicle is present in a predetermined distance at least either ahead of the hybrid vehicle or behind the hybrid vehicle,
while the vehicle control device shifts to the hybrid drive when the vehicle condition is met.

2. The vehicle control device according to claim 1, wherein upon non-satisfaction of the vehicle condition in the motor drive in the self-driving mode, the vehicle control device allows for a shift to the hybrid drive when a value obtained by subtracting a vehicle speed from a target vehicle speed is larger than a reference value.

3. The vehicle control device according to claim 1, wherein upon non-satisfaction of the vehicle condition in the motor drive in the self-driving mode, the vehicle control device shifts the drive of the hybrid vehicle to the hybrid drive when there is a requirement for warm-up of the engine or a requirement for warm-up of a catalyst placed in an exhaust system of the engine.

4. A vehicle control device mounted on a hybrid vehicle including an engine, a motor and a power storage device that transmits power to and from the motor and configured to control the engine and the motor such as to drive the hybrid vehicle while changing over between motor drive without operation of the engine and hybrid drive with operation of the engine and to start the engine and shift the drive of the hybrid vehicle to the hybrid drive when a parameter involved in driving output becomes equal to or larger than a start reference value of the engine during the motor drive, wherein
in the motor drive in a self-driving mode where the hybrid vehicle is driven independently of a driver's accelerating operation or decelerating operation,
the vehicle control device maintains the motor drive and restricts the parameter in a range smaller than the start reference value when a vehicle condition is not met, where the vehicle condition is a condition that any other vehicle is present in a predetermined distance at least either ahead of its own vehicle or behind the own vehicle,
while the vehicle control device shifts to the hybrid drive and does not restrict the parameter in the range smaller than the start reference value when the vehicle condition is met.

5. The vehicle control device according to claim 4, wherein upon non-satisfaction of the vehicle condition in the motor drive in the self-driving mode, the vehicle control device does not restrict the parameter in the range smaller than the start reference value when a value obtained by subtracting a vehicle speed from a target vehicle speed is larger than a reference value.

6. The vehicle control device according to claim 4, wherein upon non-satisfaction of the vehicle condition in the motor drive in the self-driving mode, the vehicle control device causes the parameter to be equal to or larger than the start reference value when there is a requirement for warm-up of the engine or a requirement for warm-up of a catalyst placed in an exhaust system of the engine.

7. The vehicle control device according to claim 4, wherein when the parameter becomes smaller than a stop reference value of the engine that is equal to or smaller than the start reference value during the hybrid drive, the vehicle control device stops operation of the engine and shifts the drive of the hybrid vehicle to the motor drive, and
in the hybrid drive in the self-driving mode,
the vehicle control device restricts the parameter in a range equal to or larger than the stop reference value when the vehicle condition is not met, while not restricting the parameter in the range equal to or larger than the stop reference value when the vehicle condition is met.

8. A vehicle control device mounted on a hybrid vehicle including an engine, a motor and a power storage device that transmits power to and from the motor and configured to control the engine and the motor such as to drive the hybrid vehicle while changing over between motor drive without operation of the engine and hybrid drive with operation of the engine, wherein
in a process of starting the engine in a self-driving mode where driving output is controlled independently of a driver's accelerating operation or decelerating operation,
the vehicle control device shifts to the hybrid drive and performs a first start control to start the engine while giving preference to a response over reduction of starting shock when a vehicle condition is met, where the vehicle condition is a condition that any other vehicle is present in a predetermined distance at least either ahead of the hybrid vehicle or behind the hybrid vehicle, and
the vehicle control device maintains the motor drive and performs a second start control to start the engine while giving preference to the reduction of starting shock over the response when the vehicle condition is not met.

9. The vehicle control device according to claim 8, wherein the second start control is a control of decreasing a cranking torque when the engine is cranked by the motor, compared with the first start control.

10. The vehicle control device according to claim 8, wherein the second start control is a control of decreasing a throttle position when the engine is cranked by the motor, compared with the first start control.

11. The vehicle control device according to claim 8, wherein the second start control is a control of delaying an ignition timing of the engine, compared with the first start control.

* * * * *